(12) United States Patent
Barnett et al.

(10) Patent No.: US 6,995,313 B1
(45) Date of Patent: Feb. 7, 2006

(54) INSULATOR BUSHING WILDLIFE GUARD

(75) Inventors: A. Darren Barnett, Sheridan, AR (US); Bobby A. Milner, Pine Bluff, AR (US)

(73) Assignee: Central Moloney, Inc., Pine Bluff, AR (US)

( * ) Notice: Subject to any disclaimer, the term of this patent is extended or adjusted under 35 U.S.C. 154(b) by 44 days.

(21) Appl. No.: 11/101,324

(22) Filed: Apr. 7, 2005

(51) Int. Cl.
  *H01B 17/00* (2006.01)
(52) U.S. Cl. .................. 174/5 R; 174/138 F; 29/235
(58) Field of Classification Search .............. 174/5 R, 174/40 R, 137 R, 138 F
  See application file for complete search history.

(56) References Cited

U.S. PATENT DOCUMENTS

| | | |
|---|---|---|
| 983,039 A | 1/1911 | Field |
| 1,177,867 A | 4/1916 | Johnson |
| 1,598,155 A | 8/1926 | Salisbury |
| 1,988,435 A | 1/1935 | Beebe |
| 2,065,315 A * | 12/1936 | Howard ............... 174/5 R |
| 2,682,591 A | 6/1954 | Killian |
| 2,834,829 A * | 5/1958 | Broverman ........... 174/138 F |
| 2,875,267 A | 2/1959 | Sutton, Jr. |
| 3,042,736 A | 7/1962 | Salisbury |
| 3,079,457 A | 2/1963 | Newcomb, Jr. |
| 3,133,984 A | 5/1964 | Farough et al. |
| 3,238,291 A | 3/1966 | Bosch et al. |
| 3,270,120 A | 8/1966 | Van Name et al. |
| 3,328,511 A | 6/1967 | Cagle et al. |
| 3,510,568 A | 5/1970 | Cochrane |
| 3,639,681 A | 2/1972 | Ettinger |
| 3,824,676 A | 7/1974 | Ebert |
| 3,922,476 A | 11/1975 | Clutter et al. |

(Continued)

OTHER PUBLICATIONS

Product Data Sheet, Shedmount Wildlife Guards, Central Moloney, Inc., Pine Bluff AR, Aug. 20, 2003, 2 pages.

(Continued)

*Primary Examiner*—Dean A. Reichard
*Assistant Examiner*—Adolfo Nino
(74) *Attorney, Agent, or Firm*—Ray F. Cox, Jr.

(57) ABSTRACT

An insulator bushing wildlife guard having features for easier alignment and installation of the guard on the bushing. The guard has two hinged body sections of insulating material. An outer edge of each body section is provided with a plurality of flexible fingers that allow conductors to pass through from the interior to the exterior of the enclosure when the two portions of the guard are engaged. In one embodiment, the guard is spring biased toward a closed position. A handle on the back has inner grooves to make it easier to grasp and manipulate the guard using a shotgun stick. On a lower front side of each portion of the guard, spaced-apart, curved, horizontal upper and lower flanges help align the guard with the topmost skirt of a bushing. Medial walls having a curved, sloped, concave or otherwise inwardly-directed configuration between the two flanges facilitate forcing the guard open by pushing it against the bushing. An external tab limiter, disposed above the upper flange, makes it difficult to install the guard over any part of the bushing other than the topmost skirt of the bushing. An alternative version of the guard has a releasable trigger, which is used to hold the two portions in an open position until the bushing or power line displaces the trigger and allows the biasing spring to close the two cover portions. The guard is provided with a handle for grasping by a manipulator tool. In one embodiment the handle is provided with inner grooves for grasping by a shotgun stick. In another embodiment, an adapter releasably engages the handle and provides means for attachment to a hotstick.

30 Claims, 7 Drawing Sheets

U.S. PATENT DOCUMENTS

| | | | |
|---|---|---|---|
| 4,159,395 A | 6/1979 | Cogelia | |
| 4,255,610 A | 3/1981 | Textoris | |
| 4,280,013 A | 7/1981 | Clutter | |
| 4,433,630 A | 2/1984 | Laborie | |
| 4,449,010 A | 5/1984 | Apperson et al. | |
| 4,542,363 A | 9/1985 | Kato et al. | |
| 4,628,145 A * | 12/1986 | Kolcio et al. | 174/5 R |
| 4,707,562 A * | 11/1987 | Whited | 174/5 R |
| 4,845,307 A | 7/1989 | Cumming et al. | |
| 5,153,383 A * | 10/1992 | Whited et al. | 174/138 F |
| D348,429 S | 7/1994 | Farmer | |
| D357,458 S * | 4/1995 | Tisbo | D13/118 |
| 5,648,641 A | 7/1997 | Guthrie | |
| 5,650,594 A | 7/1997 | Urnovitz | |
| 5,679,922 A * | 10/1997 | Harben | 174/5 R |
| 5,794,495 A | 8/1998 | Anderson | |
| 5,864,096 A | 1/1999 | Williams et al. | |
| 5,873,324 A | 2/1999 | Kaddas et al. | |
| 5,994,644 A | 11/1999 | Rindoks et al. | |
| 6,005,196 A | 12/1999 | Spillyards | |
| 6,018,453 A | 1/2000 | Daharsh et al. | |
| 6,248,956 B1 * | 6/2001 | Cook et al. | 174/155 |
| 6,255,597 B1 | 7/2001 | Bowling et al. | |
| 6,291,774 B1 | 9/2001 | Williams | |
| 6,486,785 B1 | 11/2002 | Hoth | |
| 6,878,883 B1 * | 4/2005 | Rauckman | 174/5 R |
| 2002/0117313 A1 | 8/2002 | Spencer | |
| 2003/0015330 A1 | 1/2003 | Wood et al. | |
| 2003/0140735 A1 | 7/2003 | Weaver et al. | |

OTHER PUBLICATIONS

Catalog, One Piece Wildlife Protector, Cat. No. GS-560, Fargo Mfg. Company, Inc., Poughkeepsie NY, Sep. 1988, 1 page.

Catalog, One Piece Wildlife Protector, Cat. No. GS-565, Fargo Mfg. Company, Inc., Poughkeepsie NY, at least as early as Jul. 4, 1989 (date of issuance of U.S. Pat. No. 4,845,307, 1 page.

New Product Bulletin, Fargo GS-500 Series Wildlife Protectors for Equipment Bushings, Fargo Mfg. Company, Inc., Poughkeepsie NY, Jul. 1990, 2 pages.

Catalog, One Piece Wildlife Protector, Fargo Mfg. Company, Inc., Poughkeepsie NY, Oct. 1990, 1 page.

Production Drawing, Shed Mount Wildlife Guard, Central Moloney, Inc., Pine Bluff AR, Dec. 1, 1998, offer for sale at least as early as Sep. 1998, 1 page.

Product Data Sheet, "Shedmount" Wildlife Guard. File No. PDS1033, central Moloney, Inc,. Pine Bluff AR, Nov. 15, 1998, Offer for sale at least as early as Sep. 1998, 2 pages.

Website, www.hendrix-wc.com, BG-9 Wildlife Guard, Hendrix Wire & Cable, Inc., Milford NH, at least as early as Feb. 8, 2004, 1 page.

* cited by examiner

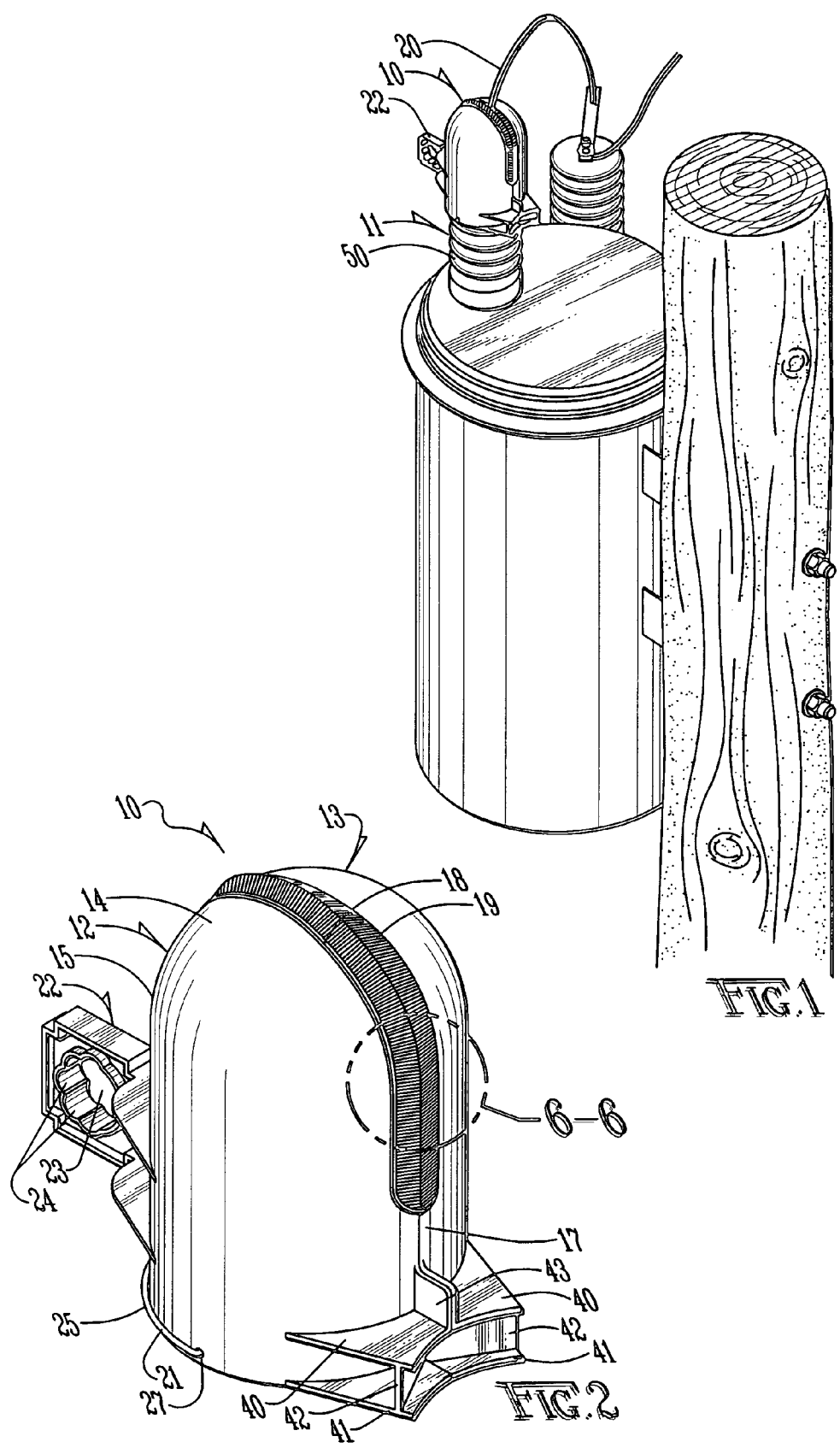

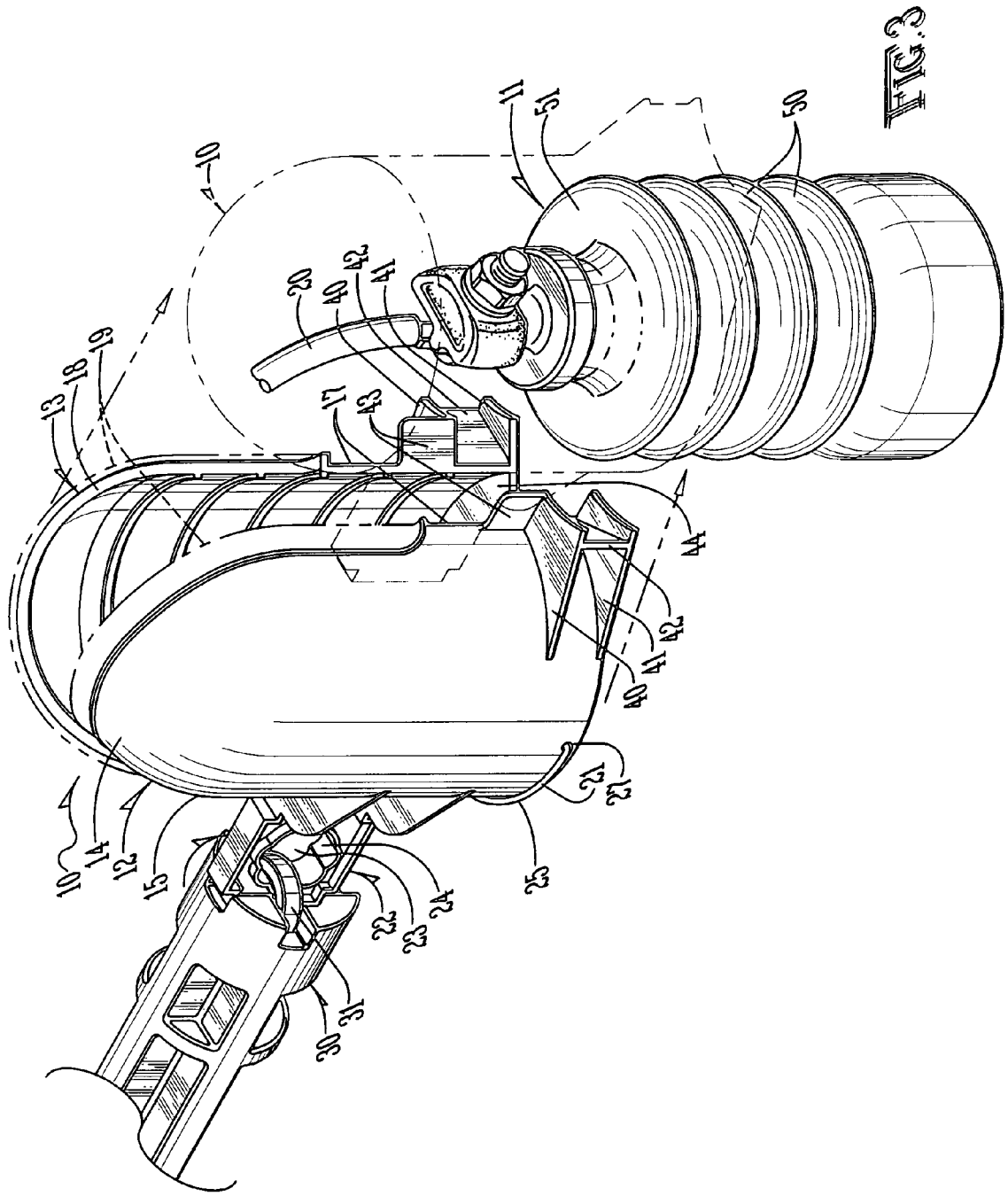

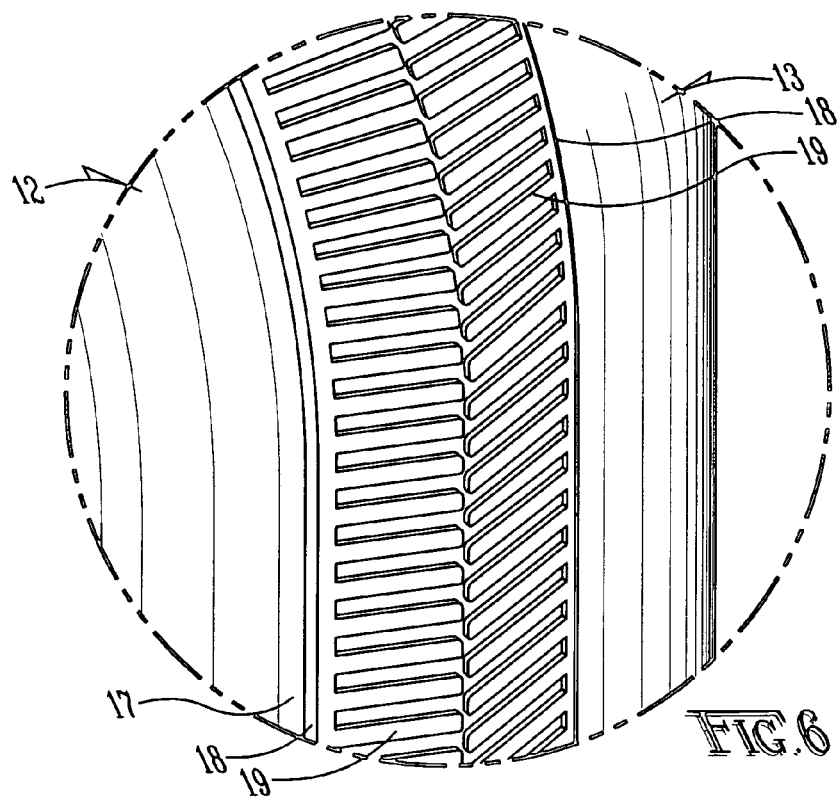
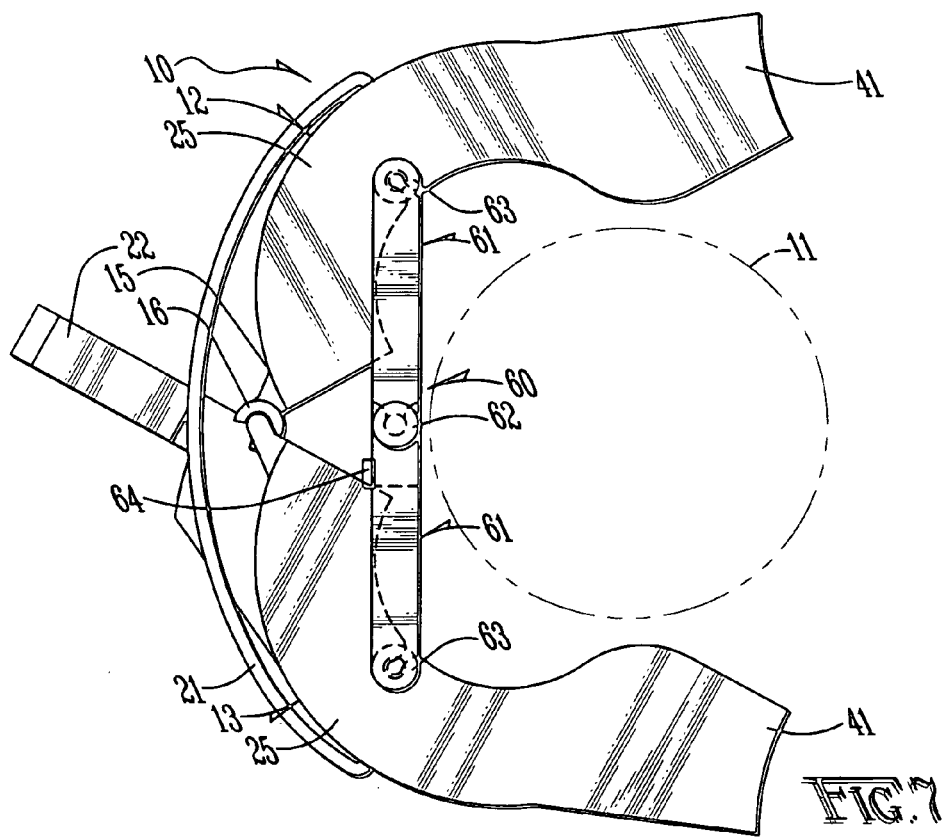

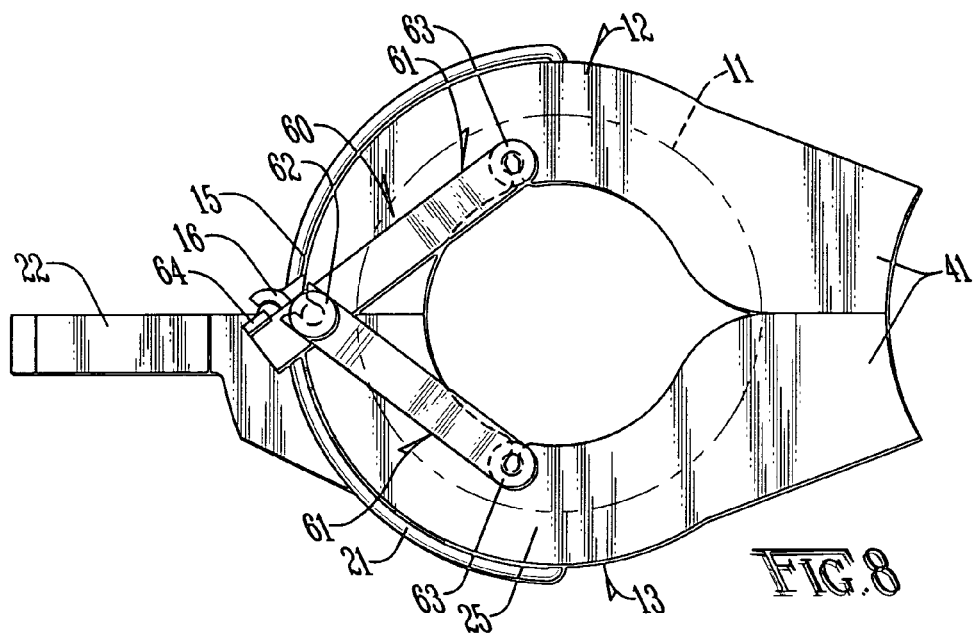
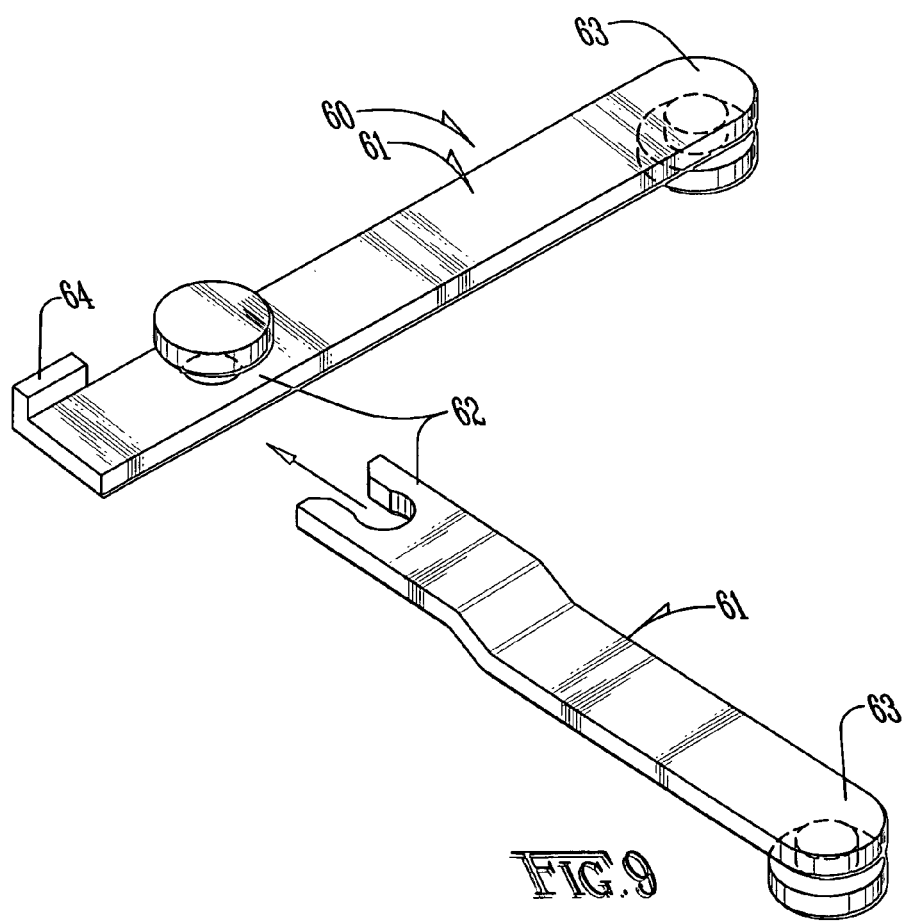

US 6,995,313 B1

INSULATOR BUSHING WILDLIFE GUARD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to wildlife guards for protecting electrical equipment from shorts caused by wildlife, and in particular, to such a wildlife guard that is easily aligned and installed on an insulator bushing.

2. Brief Description of the Related Art

Squirrels, birds, and the like often climb onto or perch on transformers, power lines, and insulator bushings. If the distance between an energized terminal and a ground or another terminal is too short, an animal may come into contact with both at the same time. This will typically cause an electrical short and kill the animal. It may also damage equipment and cause power outages. Wildlife guards are typically used as a barrier to maintain adequate space between the animal and the energized part to decrease the chances of an animal causing an electrical short.

U.S. Pat. No. 4,845,307 issued to Cumming et al. discloses a one-piece guard with a V-shaped indentation running down one side. A cut is made in the bottom of the V-shaped indentation, forming a slot. To install the guard, a worker using a live-line tool, pushes or pulls the V-shaped indentation against a cable so that the cable pops through the slot into the interior of the guard. Inner protrusions snap into place over the uppermost skirt of the bushing.

U.S. Pat. No. 6,005,196 to Spillyards discloses a guard having two hinged body sections that are biased by a spring assembly toward a closed position. Before installation, a releasable trigger keeps the guard in an open position until the trigger is released. To install the guard of Spillyards, a worker using a manipulator pole pushes the guard over a power line. The power line trips the releasable trigger, and the two body sections snap shut around the line. The installer then pulls the guard down over the topmost skirt of the bushing.

U.S. Pat. No. 6,255,597 to Bowling et al. discloses a guard having two cover portions that are pivotally connected, but the two cover portions are not spring-biased toward a closed position. Instead, the guard of Bowling et al. relies upon force applied to lever arms as the guard is pushed against a bushing to move the guard to a closed position. To install the guard of Bowling et al., a worker using a manipulator pole forces the lever arms against a bushing, and that force moves the cover portions to a closed position.

All three of these guards are very difficult to install in close proximity to the electrical equipment and extremely difficult to install from the ground.

U.S. Pat. No. 5,648,641 to Guthrie discloses a guard that takes a very different approach to the problem of providing a barrier to animals and relies on current passing through the live wire to create an electrostatic charge in a plurality of radially-extending spokes. Guthrie discloses an embodiment in which a gap is left between the ends of two semi-circular sections opposite a spring. The gap facilitates installing the device onto a bushing.

U.S. Pat. No. 3,042,736 to G. F. Salisbury discloses a protective cover to protect linemen by enclosing wire, insulators, switches, etc. with insulating protective covers. The cover is a corrugated sleeve with enlarged annular flanges of resilient material lying in planes transverse to the axis of the sleeve. Slots are formed in the sleeve and the flanges. The resilient flanges tend to bias the edges of the slots together. Longitudinal lips have diverging ends so they define a converging entrance. The cover also has a flange or lifting bar with holes to facilitate grasping by a hot stick applicator. When the cover is forced over a power line the lips and the edges of the slots momentarily separate. After the entrance of the wire, the resilience of the material causes the edges to return to initial position. The device may then be moved along a line, until it encloses an electrical device, such as dead end bells.

U.S. Pat. No. 1,598,155, issued in 1926 to M. B. Salisbury, discloses an insulated protective cover that is pushed over both an insulator and conductors. A hood section is sized to conform to the shape of the insulator and has openings in the lower ends of its sides that are adapted to receive the conductor. At the lower end of the inner surface is a bead that secures the cover to the insulator.

U.S. Pat. No. 6,255,597 to Bowling et al. and U.S. Pat. No. 6,291,774 to Williams discloses the use of flexible fingers on a wildlife guard to allow the entry of a conductor while fitting closely around the conductor.

U.S. Pat. No. 3,824,676 to Ebert discloses a bushing cover that is positioned on a bushing using an applicator tool. The cover is a resilient sleeve having edges that normally overlap. The bushing cover may be spread open so that the edges are separated. The applicator tool has hooked channels for holding the edges apart. The cover is positioned around the bushing. As the operator pushes the cover against the bushing, the cover deforms and the edges are pulled out of the channels so that the edges snap out of the channels and closes around the bushing 16. The applicator tool has an adjustable ratchet fitting designed to fit a universal pole which has a matching ratchet fitting.

U.S. Pat. No. 4,159,395 to Cogelia discloses a self-locking cable guard having an inverted-V cross section with the legs of the V bend inwardly to define a substantially enclosed cavity for receiving the cable. The bent leg sections define an expandable resilient spaced gap which facilitates snap-on installation of the guard.

The BG-9 Wildlife Guard manufactured by Hendrix Wire & Cable, Inc., Milford N.H. is a wildlife guard for installation on the bushings of transformers and other power equipment. The guard is intended to mount over the top skirt of the bushing and is provided with a vertical internal block to ensure proper installation on a bushing. The vertical internal block does not allow for opened guards to be nested together for maximum efficiency in packing a number of guards for shipping.

References mentioned in this background section are not admitted to be prior art with respect to the present invention.

BRIEF SUMMARY OF THE INVENTION

The present invention comprises two body sections of insulating material which are hinged together along the back side. When the two body sections are engaged, the two sections form a generally cylindrical enclosure about the bushing. The enclosure has a generally dome-shaped top.

Along the top and front side of each body section, an outer edge is provided with a plurality of flexible fingers that contact when the two body sections of the guard are engaged. The flexible fingers allow conductors of various sizes and locations to pass through from the interior to the exterior of the enclosure when the two sections of the guard are engaged while minimizing openings that would allow the incursion of wildlife.

The present invention includes features designed to make alignment and installation on the bushing easier than with competitive devices. In one version, the guard is spring-biased toward a closed position. A handle on the back of one of the body sections has inner grooves to make it easier to grasp and manipulate the guard using a manipulator tool of the type called a shotgun stick. On a lower front side of each body section of the guard, spaced-apart, horizontal upper and lower flanges help align the guard with the topmost skirt of a bushing. Medial walls that are curved, sloped, concave or otherwise inwardly-directly between the two flanges make it easy to force the guard open by pushing it against the bushing. An external tab limiter, disposed above the upper flange, makes it difficult to install the guard over any part of the bushing other than the topmost skirt of the bushing. To install the guard, a worker using a manipulator tool pushes the closed guard against the topmost skirt of the bushing. The flanges and tab help to position and align the guard with the topmost skirt, and the inwardly-directing medial surfaces between the flanges make it easy for the bushing to force the spring-biased body sections apart as the guard is pushed against the topmost skirt. As the guard moves into place, the spring snaps the two body sections into engagement to form a closed position.

An alternative version of the guard has a releasable trigger, which is used to hold the two body sections in an open position until the bushing or power line displaces the trigger and allows the biasing spring to close the two sections. The releasable trigger comprises two trigger arms pivotally connected at their inner ends. The outer ends of the trigger arms are pivotally connected to respective body sections. When the two body sections are opened against the biasing force of the spring and the trigger arms are in alignment, a quasi-stable configuration of the trigger arms results and the two body sections are held apart against the closing force provided by the biasing spring. When the inner pivot point of the trigger is displaced slightly inwardly by contact with a bushing or conductor, the trigger arms are no longer in a stable configuration and continue to pivot inwardly under the force of the biasing spring, thereby allowing the two body sections to close together. A stop prevents the trigger arms from being displaced outwardly from the quasi-stable configuration; they can only be displaced inwardly.

An adapter may optionally be placed over the handle to allow the guard to be grasped by the type of manipulator tool known as a hotstick. The end of the hotstick has a radially-arranged series of wedge-shaped protrusions which interlock at various angles with a similar arrangement on the adapter. The adapter is fastened to the end of the hotstick by a wingnut. Once the wildlife guard is installed, the adapter slips off the handle.

It is therefore an object of the present invention to provide for a wildlife guard having external, horizontal flanges that are used for aligning a guard with the topmost skirt of a bushing.

It is a further object of the present invention to provide for a wildlife guard that uses an external tab limiter that prevents or makes it difficult to install a guard over any part of a bushing except the topmost skirt of the bushing.

It is also an object of the present invention to provide for a wildlife guard that is biased to a closed position and that is installed by pushing the closed guard against a bushing or line.

These and other features, objects and advantages of the present invention will become better understood from a consideration of the following detailed description of the preferred embodiments and appended claims in conjunction with the drawings as described following.

BRIEF DESCRIPTION OF THE SEVERAL VIEWS OF THE DRAWINGS

FIG. 1 is a perspective view of the wildlife guard of the present invention installed on an insulator bushing.

FIG. 2 is a perspective view of an embodiment of the wildlife guard of the present invention which is installed by forcing the wildlife guard against an insulator bushing.

FIG. 3 is a perspective view of the wildlife guard of FIG. 2 attached to a shotgun stick and being installed on an insulator bushing.

FIG. 6 is a detailed view of the flexible fingers of the wildlife guard of FIG. 2 along the line 6—6.

FIG. 7 is bottom plan view of an alternative embodiment of the present invention having a releasable trigger to hold the two body sections of the wildlife guard in an open position until the bushing or power line displaces the trigger and allows the biasing spring to close the two body sections. In this view the body sections are shown in the open position.

FIG. 8 is a bottom plan view of the alternative embodiment of FIG. 7 with the body sections in the closed position after the release of the trigger.

FIG. 9 is an exploded perspective view of the releasable trigger of FIG. 8.

FIG. 13 shows the adapter attached to a hotstick and installed over the handle of the guard.

DETAILED DESCRIPTION OF THE INVENTION

With reference to attached FIGS. 1–6, the preferred embodiments of the present invention are described as follows. As shown in FIG. 1, the present invention is a wildlife guard 10 for protecting electrical equipment, such as an insulator bushing 11, from shorts caused by wildlife. The bushing 11 comprises a plurality of skirts 50. It is desirable to install the wildlife guard 10 on the topmost bushing skirt 51 in order to maximize its insulating and protective value. The wildlife guard 10 has features that allow it to be easily aligned and installed on the topmost skirt 51 of the insulator bushing 11.

Figure 4:
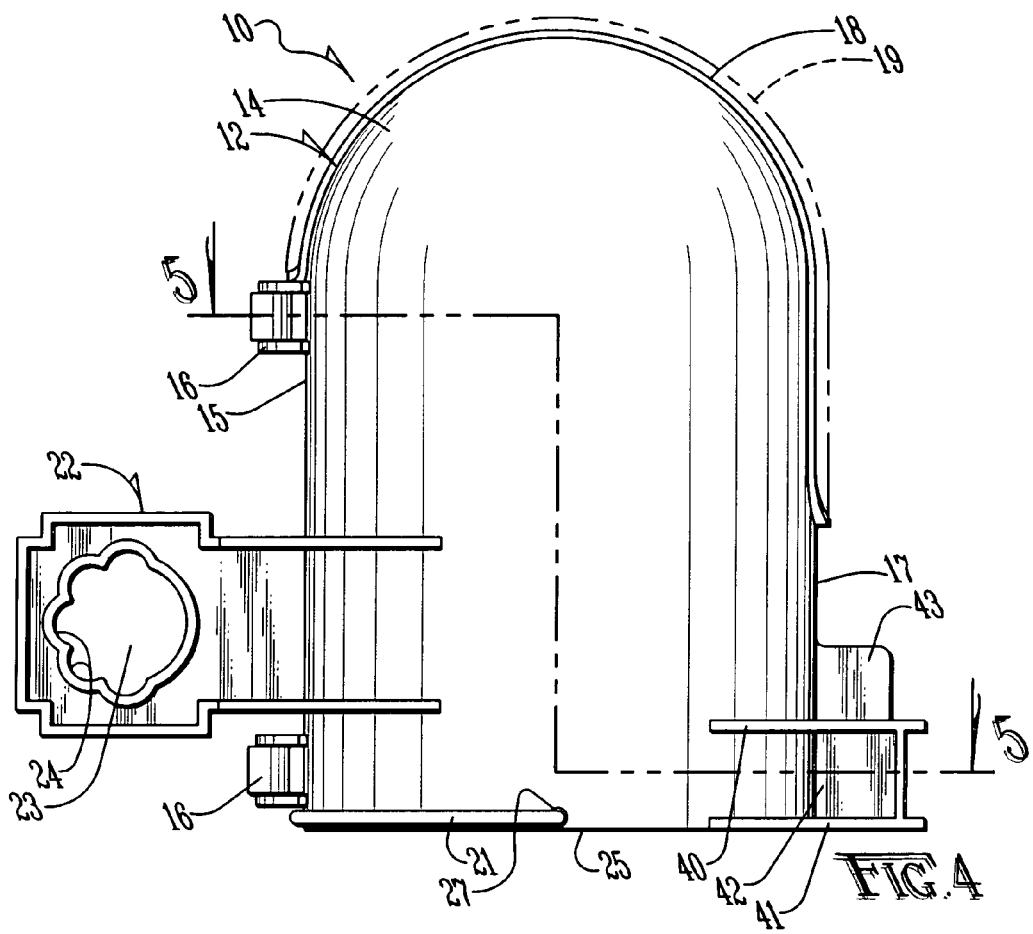
FIG. 4 is a side elevational view of the wildlife guard of FIG. 2.
Figure 5:
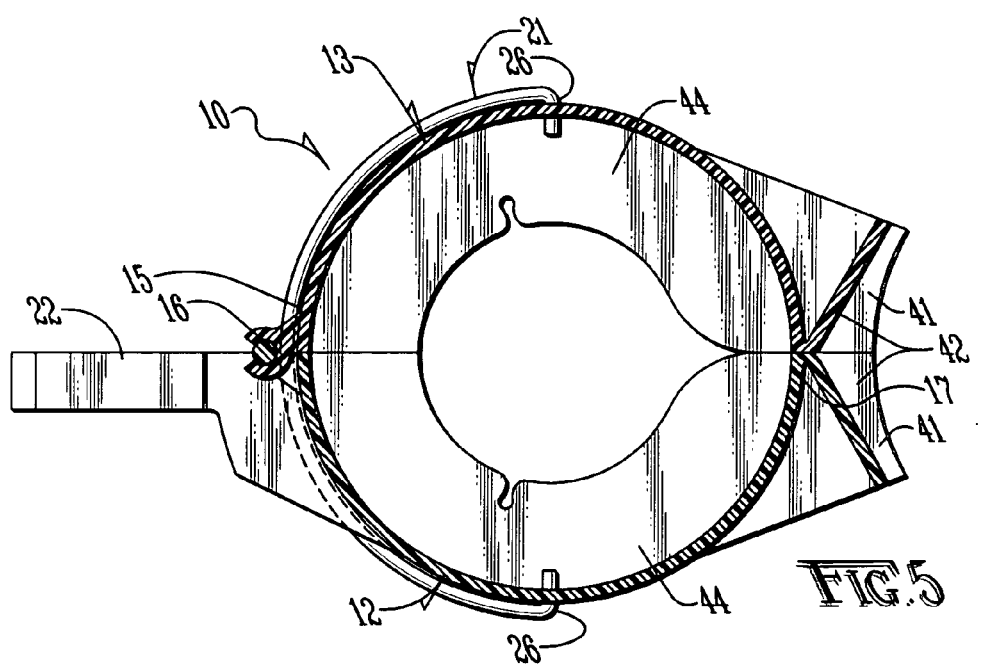
FIG. 5 is a top plan cross-sectional view of the wildlife guard along the line 5—5 of FIG. 4.

As shown in FIG. 2, the wildlife guard 10 comprises two body sections 12, 13 of insulating material. The body sections 12, 13 are pivotally connected together along the back side 15 of each body section 12, 13 as shown in FIG. 4. The pivotal attachment may be by hinges 16 although the present invention is not limited to pivotal connection using hinges. Other forms of pivotal connection known in the art would be acceptable in the practice of the present invention. For example, the body sections 12, 13 may be molded in one piece with a thin membrane of plastic serving as the pivotal connection between the two sections 12, 13. When the two body 12, 13 sections are engaged as shown in FIG. 1, the two sections 12, 13 form a generally cylindrical enclosure about the bushing 11. The enclosure has a generally dome-shaped top 14. As shown in FIGS. 2 and 6, along the top 14 and front side 17 of each section 12, 13, an outer edge 18 is provided with a plurality of flexible fingers 19 that contact when the two body sections 12, 13 of the guard are engaged. The flexible fingers 19 allow a conductor 20 to pass through from the interior to the exterior of the enclosure when the two body sections 12, 13 of the guard are engaged.

The guard 10 is biased toward a closed position by a spring 21. The biasing spring 21 is desirably in the form of a semi-circular loop of resilient material that fits around the lower rear edges 25 of the two body sections 12, 13. The biasing spring 21 has short extensions 26 at right angles to fit into slots 27 on the body sections 12, 13. The biasing spring 21 may be installed into grooves (not shown) in the bottom edges of the body sections 12, 13.

On a lower front side of each section 12, 13 of the guard 10, spaced-apart, horizontal upper and lower flanges 40, 41 help align the guard 10 with the topmost skirt 51 of the insulator bushing 11. It is desirable that the upper and lower flanges 40, 41 be curved on their outer edges to substantially match the curvature of the skirts 50, 51 of the insulator bushing 11. In alternative embodiments, only upper flanges or lower flanges may be employed. Medial walls 42 having curved, sloped, concave, or otherwise inwardly-directed configurations adjacent to or between the two flanges 40, 41 make it easy to force the guard 10 open by pushing it against the bushing 10. An external longitudinal tab 43, disposed above the upper flange 40, makes it difficult to install the guard 10 over any part of the bushing 11 other than the topmost skirt 51 of the bushing 11.

With respect to FIGS. 1–5, one embodiment of the present invention is described in which the guard 10 is installed using a manipulator tool of the type known as a shotgun stick 30. The shotgun stick 30 operates by a pumping action to open and close a hooked fixture 31 on the end. A handle 22 on the back of one of the body sections 12, 13 has an opening 23 with a plurality of inner grooves 24 to make it easier to grasp and manipulate the guard 10 using the shotgun stick 30. Once the guard 10 is installed, the guard 10 is released from the shotgun stick 30 by releasing the handle 22 from the hooked fixture 31. The guard may also be installed using a different type of manipulator tool known as a hotstick as described hereinafter. The present invention is not limited to the preferred embodiment of the handle 22 as described above. As used herein, the term "handle" refers to any appendage by which a manipulator tool may grasp the guard 10. For example, the handle may be located on either body section or both.

As shown in FIG. 3, to install the guard 10, a worker using a shotgun stick 30 pushes the closed guard 10 against the topmost skirt 51 of the bushing 11. The flanges 40, 41 and tab 43 help to position and align the guard 10 with the topmost skirt 51, and the inwardly-directed medial surfaces 42 between the flanges 40, 41 make it easy for the bushing 11 to force the spring-biased body sections 12, 13 apart as the guard 10 is pushed against the topmost skirt 51. As the guard 10 moves into place, the biasing spring 21 snaps the two body sections 12, 13 into engagement in a closed position to form an enclosure around the topmost skirt 51 of the bushing 11. Interior flanges 44 disposed on respective lower ends of the body sections 12, 13 fit closely around and underneath the topmost skirt 51 of the bushing 11 when the two body sections 12, 13 are in the closed position.

As shown in FIGS. 7–11, an alternative version of the guard 10 has a releasable trigger 60, which is used to hold the two body sections 12, 13 in an open position until the bushing 11 or power line displaces the trigger 60 and allows the biasing spring 21 to close the two sections 12, 13. The releasable trigger 60 comprises two trigger arms 61 pivotally connected at their inner ends 62. The outer ends 63 of the trigger arms 61 are pivotally connected to respective body sections 12, 13. When the two body sections 12, 13 are opened against the biasing force of the spring 21 and the trigger arms 61 are in alignment as shown in FIG. 7, a quasi-stable configuration of the trigger arms 61 results and the two body sections 12, 13 are held apart against the closing force provided by the biasing spring 21. When the inner pivot point 62 is displaced slightly inwardly by contact with a bushing 11 or conductor 20, the trigger arms 61 are no longer in a stable configuration and continue to pivot inwardly under the force of the biasing spring 21, thereby allowing the two body sections 12, 13 to close together as shown in FIG. 8. A stop 64 prevents the trigger arms 61 from being displaced outwardly from the quasi-stable configuration; they can only be displaced inwardly.

Figure 10:
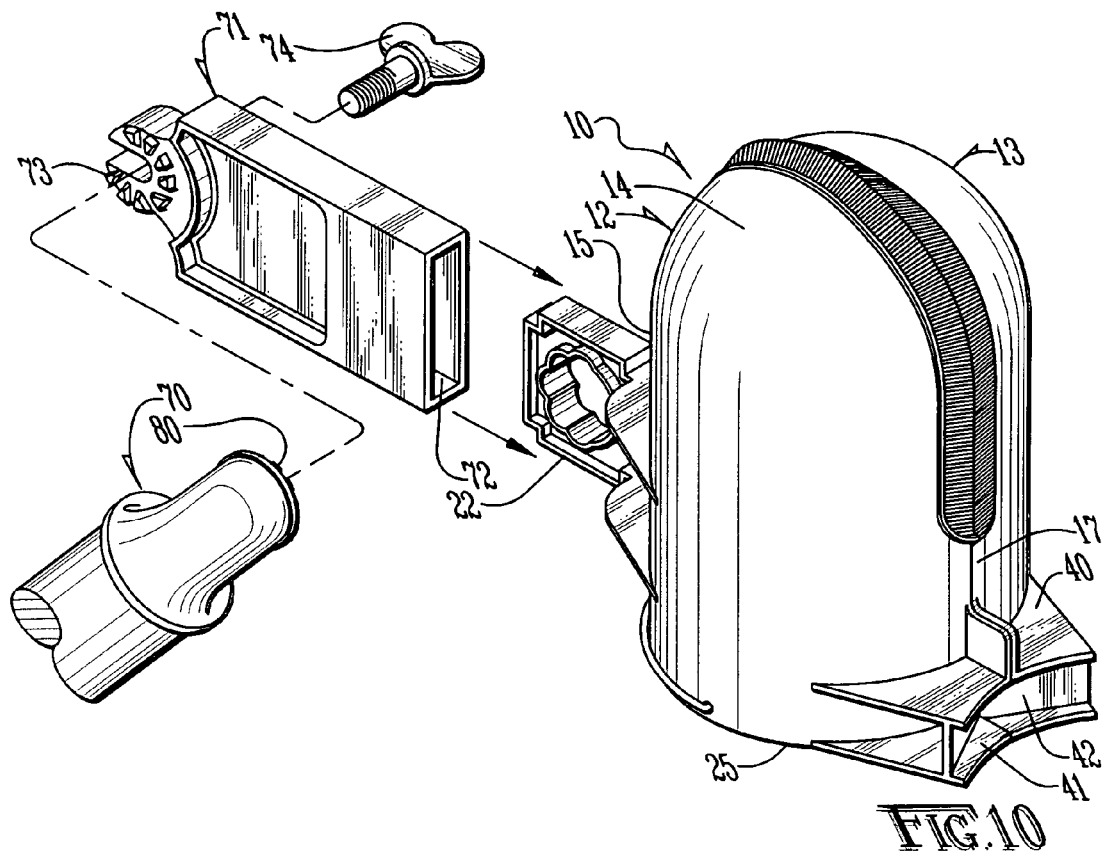
FIG. 10 is an exploded perspective view of one embodiment of the adapter for a hotstick and FIG. 11 is a perspective view showing the adapter attached to a hotstick and installed over the handle of the guard.
Figure 11:
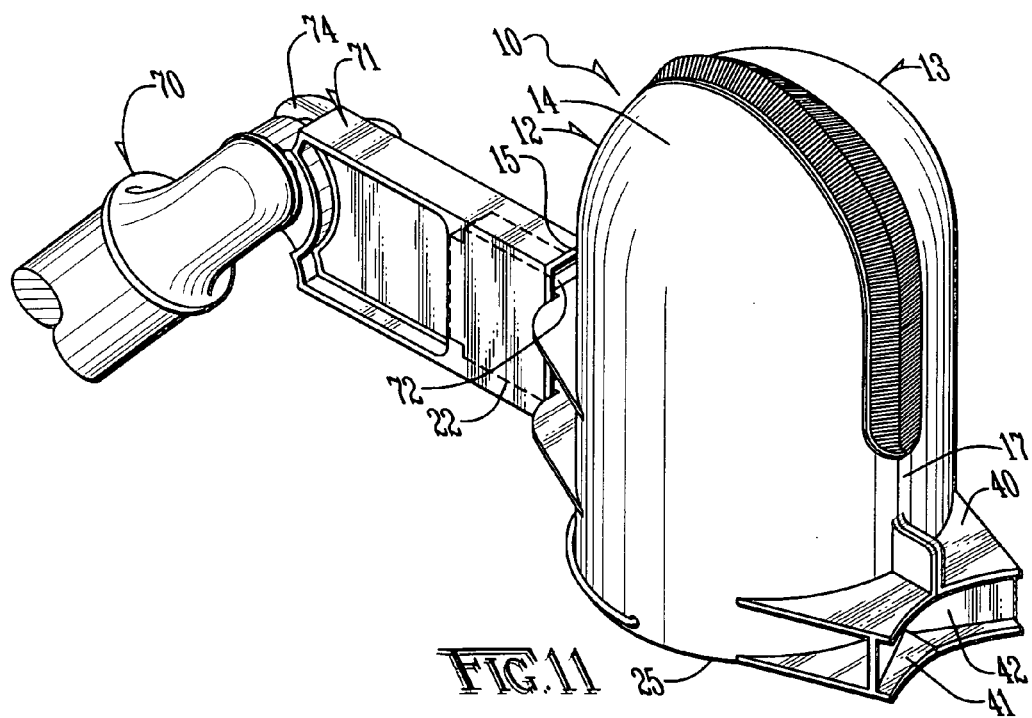
Figure 12:
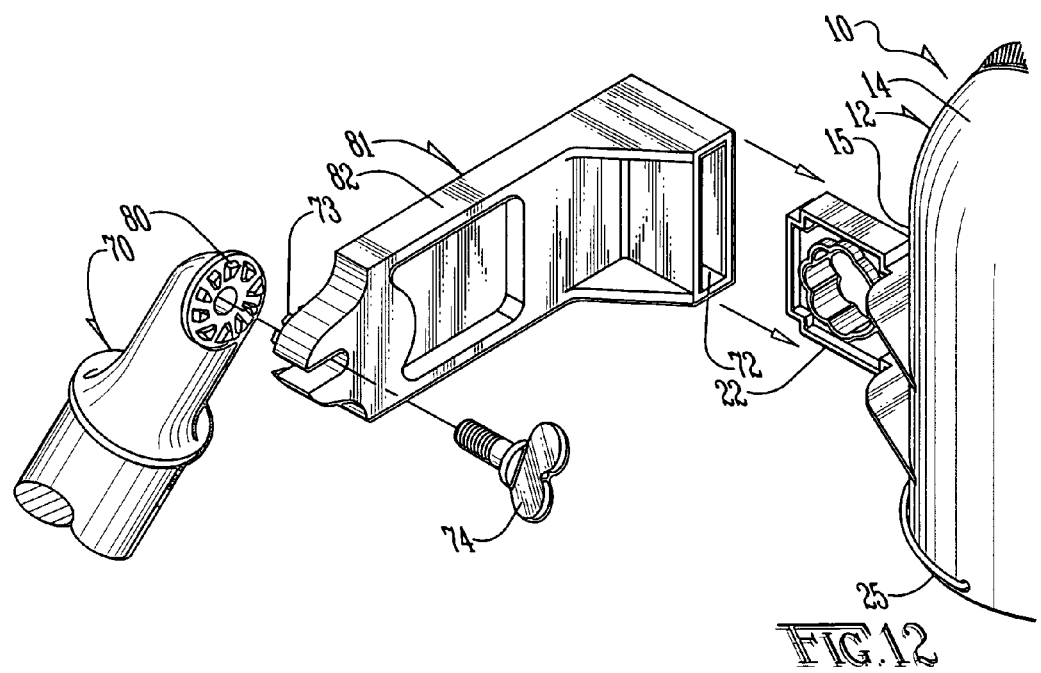
FIG. 12 is an exploded perspective view and FIG. 13 is a perspective view showing an alternative embodiment of the adapter with a right angle extension to the handle.
Figure 13:
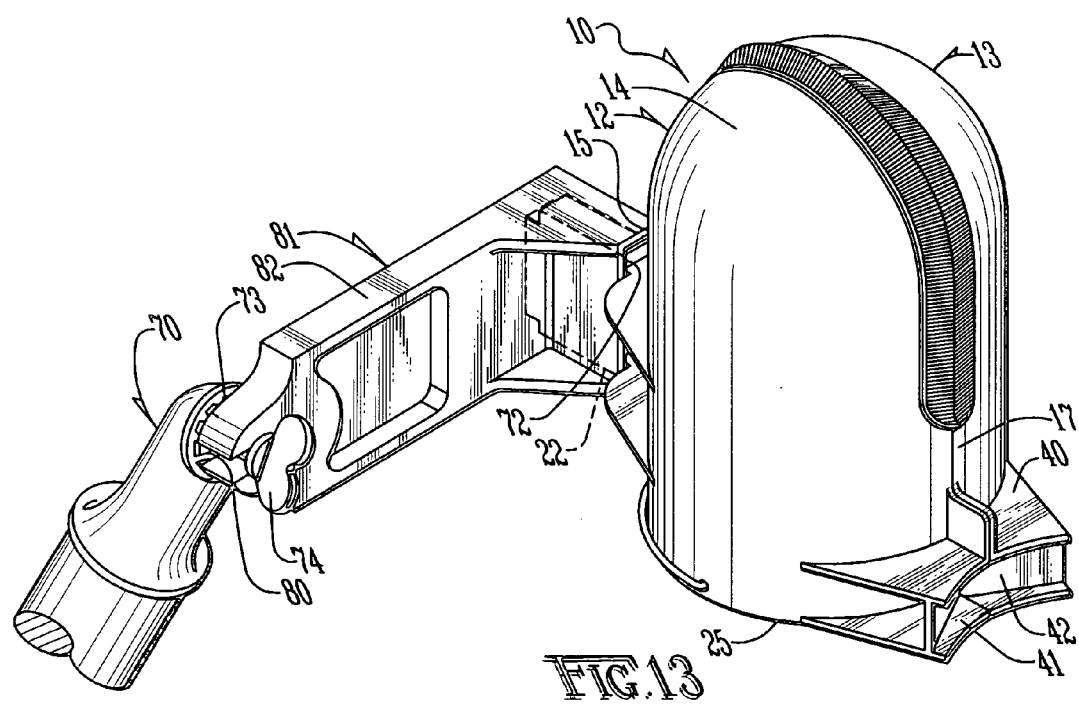

As noted above, the guard 10, preferably the second embodiment with the releasable trigger 60, may also be installed from the ground with the widely-used type of manipulator tool known as a hotstick 70. As shown in FIGS. 10–13, the hotstick 70 is designed to be fitted with a variety of tools since the end of the hotstick 70 has a radially-arranged series of wedge-shaped protrusions 80 which interlock with a similar arrangement of wedge-shaped protrusions 73 on the tool (in this case, the adapter 71, 81). As shown in FIGS. 10 and 11, a releasable adapter 71 engages the handle 22 by sliding the handle 22 into a complementary recess 72 in the adapter 71. The adapter 71 is provided with an arrangement of radially-arranged wedge-shaped protrusions 73 to complement the arrangement 80 on the hotstick. The adapter 71 is fastened to the end of the hotstick 70 by a wingnut 74 as is conventionally known at any suitable angle to the hotstick 70 as determined by the operator. Once the wildlife guard 10 is installed on the bushing 11, the adapter 71 is easily disengaged from the handle 22 by sliding the adapter 71 off the handle 22. In the preferred alternative embodiment of the adapter 81 shown in FIGS. 12 and 13, the adapter 81 has a right angle extension 82.

The present invention has been described with reference to certain preferred and alternative embodiments that are intended to be exemplary only and not limiting to the full scope of the present invention as set forth in the appended claims.

What is claimed is:

1. A wildlife guard for an insulator bushing having a plurality of skirts and an energized conductor extending outwardly from said bushing comprising:
   a first body section and a second body section,
   a handle on at least one of said body sections,
   said first and second body sections being pivotally connected together to permit said body sections to pivot toward engagement and to pivot away from engagement, a spring biasing said first and second body sections toward engagement, spaced-apart, exterior, lateral, upper and lower flanges disposed on each of said body sections for aligning with a skirt of the bushing, and an inwardly-directed medial wall disposed on each of said body sections between said upper and lower flanges whereby pressure of the skirt of the bushing against the medial walls forces said body sections away from engagement.

2. The wildlife guard of claim 1 further comprising an external longitudinal tab disposed above said upper flanges such that only the topmost skirt of the bushing can be aligned within said upper and lower flanges.

3. The wildlife guard of claim 1, further comprising a plurality of flexible fingers disposed on an outward edge of said body sections to allow the conductor to pass therethrough.

4. The wildlife guard of claim 1, further comprising an interior flange disposed on respective ends of said body sections to fit closely around the skirt of the bushing.

5. The wildlife guard of claim 1 further comprising a releasable trigger extending between said first and second body sections to hold said body sections open against the bias of said spring.

6. The wildlife guard of claim 5, wherein said trigger comprises trigger arms pivotally connected at respective inward ends and pivotally connected to respective body sections at respective outward ends, said trigger arms being movable between a quasi-stable position holding said body sections apart when said triggers arms are in alignment and an unstable position when said trigger arms are not in alignment allowing said body sections to move toward engagement.

7. The wildlife guard of claim 1 wherein said upper and lower flanges are curved to substantially match the curvature of the insulator bushing.

8. The wildlife guard of claim 1 wherein said handle comprises an opening having a plurality of inner grooves.

9. The wildlife guard of claim 1, further comprising an adapter having means for releasably engaging said handle and having means for attachment to a hotstick.

10. The wildlife guard of claim 9, wherein said adapter further comprises a right angle extension.

11. A wildlife guard for an insulator bushing having a plurality of skirts and an energized conductor extending outwardly from said bushing, comprising:
a first body section and a second body section,
a handle on at least one of said body sections,
said first and second body sections being pivotally connected together to permit said body sections to pivot toward engagement and to pivot away from engagement,
means biasing said first and second body sections toward engagement,
means for aligning with a skirt of the bushing, and
means disposed on each of said body sections for forcing said body sections away from engagement by pressure of the skirt of the bushing.

12. The wildlife guard of claim 11 further comprising means for aligning with the topmost skirt of the bushing.

13. The wildlife guard of claim 11, further comprising flexible finger means disposed on an outward edge of said body sections for allowing the conductor to pass therethrough.

14. The wildlife guard of claim 11, further comprising an interior flange disposed on respective ends of said body sections to fit closely around the skirt of the bushing.

15. The wildlife guard of claim 11 further comprising releasable trigger means extending between said first and second body sections for holding said body sections open against said biasing means.

16. The wildlife guard of claim 15, wherein said releasable trigger means comprises trigger arms pivotally connected at respective inward ends and pivotally connected to respective body sections at respective outward ends, said trigger arms being movable between a quasi-stable position holding said body sections apart when said triggers arms are in alignment and an unstable position when said trigger arms are not in alignment allowing said body sections to move toward engagement.

17. The wildlife guard of claim 11 wherein said handle comprises and opening having a plurality of inner grooves.

18. The wildlife guard of claim 11, further comprising an adapter having means for releasably engaging said handle and having means for attachment to a hotstick.

19. The wildlife guard of claim 18, wherein said adapter further comprises a right angle extension.

20. A method for installing a wildlife guard on an insulator bushing having a plurality of skirts comprising the steps of:
(a) providing a wildlife guard comprising:
a first body section and a second body section,
said first and second body sections being pivotally connected together to permit said body sections to pivot toward engagement and to pivot away from engagement,
means biasing said first and second body sections toward engagement,
means for aligning with a skirt of the bushing, and means disposed on each of said body sections for forcing said body sections away from engagement by pressure against the skirt of the bushing;
(b) attaching said wildlife guard to a manipulator tool;
(c) aligning said wildlife guard with a skirt of the bushing;
(d) forcing the wildlife guard against the skirt of the bushing so as to initially pivot said body sections away from engagement against the action of said biasing means and continuing to force the wildlife guard against the skirt of the bushing until said biasing means pivots said body sections into engagement around the skirt of the bushing; and
(e) detaching said wildlife guard from said manipulator tool.

21. A wildlife guard for an insulator bushing having a plurality of skirts and an energized conductor extending outwardly from said bushing, comprising:
a first body section and a second body section,
a handle on at least one of said body sections, said handle comprising an opening having a plurality of inner grooves,
said first and second body sections being pivotally connected together to permit said body sections to pivot toward engagement and to pivot away from engagement,
a spring biasing said first and second body sections toward engagement,
spaced-apart, exterior, lateral, upper and lower flanges disposed on each of said body sections for aligning with a skirt of the bushing, wherein said upper and lower flanges are curved to substantially match the curvature of the insulator bushing, an inwardly-directed medial wall disposed on each of said body sections between said upper and lower flanges whereby pressure of the skirt of the bushing against the medial walls forces said body sections away from engagement, an external longitudinal tab disposed above said upper flanges such that only the topmost skirt of the bushing can be aligned within said upper and lower flanges, a plurality of flexible fingers disposed on an outward edge of said body sections to allow the conductor to pass therethrough, an interior flange disposed on respective ends of said body sections to fit closely around the skirt of the bushing.

22. A wildlife guard for an insulator bushing having a plurality of skirts and an energized conductor extending outwardly from said bushing, comprising:

a first body section and a second body section, a handle on at least one of said body sections and an adapter having means for releasably engaging said handle and having means for attachment to a hotstick, said first and second body sections being pivotally connected together to permit said body sections to pivot toward engagement and to pivot away from engagement, a spring biasing said first and second body sections toward engagement, spaced-apart, exterior, lateral, upper and lower flanges disposed on each of said body sections for aligning with a skirt of the bushing, wherein said upper and lower flanges are curved to substantially match the curvature of the insulator bushing, an inwardly-directed medial wall disposed on each of said body sections between said upper and lower flanges, an external longitudinal tab disposed above said upper flanges such that only the topmost skirt of the bushing can be aligned within said upper and lower flanges, a plurality of flexible fingers disposed on an outward edge of said body sections to allow the conductor to pass therethrough, an interior flange disposed on respective ends of said body sections to fit closely around the skirt of the bushing, and a releasable trigger extending between said first and second body sections to hold said body sections open against the bias of said spring, wherein said trigger comprises trigger arms pivotally connected at respective inward ends and pivotally connected to respective body sections at respective outward ends, said trigger arms being movable between a quasi-stable position holding said body sections apart when said triggers arms are in alignment and an unstable position when said trigger arms are not in alignment allowing said body sections to move toward engagement.

23. A wildlife guard for an insulator bushing having a plurality of skirts and an energized conductor extending outwardly from said bushing comprising:

a first body section and a second body section, a handle on at least one of said body sections, said first and second body sections being pivotally connected together to permit said body sections to pivot toward engagement and to pivot away from engagement, a spring biasing said first and second body sections toward engagement, and an inwardly-directed medial wall disposed on each of said body sections whereby pressure of the skirt of the bushing against the medial walls forces said body sections away from engagement.

24. The wildlife guard of claim 23, further comprising a plurality of flexible fingers disposed on an outward edge of said body sections to allow the conductor to pass therethrough.

25. The wildlife guard of claim 23, further comprising an interior flange disposed on respective ends of said body sections to fit closely around the skirt of the bushing.

26. The wildlife guard of claim 23 further comprising a releasable trigger extending between said first and second body sections to hold said body sections open against the bias of said spring.

27. The wildlife guard of claim 26, wherein said trigger comprises trigger arms pivotally connected at respective inward ends and pivotally connected to respective body sections at respective outward ends, said trigger arms being movable between a quasi-stable position holding said body sections apart when said triggers arms are in alignment and an unstable position when said trigger arms are not in alignment allowing said body sections to move toward engagement.

28. The wildlife guard of claim 23 wherein said handle comprises an opening having a plurality of inner grooves.

29. The wildlife guard of claim 23, further comprising an adapter having means for releasably engaging said handle and having means for attachment to a hotstick.

30. The wildlife guard of claim 29, wherein said adapter further comprises a right angle extension.

* * * * *